United States Patent
Tidd

(10) Patent No.: US 8,769,052 B1
(45) Date of Patent: Jul. 1, 2014

(54) CLOUD-BASED SERVER COMPUTING SYSTEM FOR AND METHOD OF PROVIDING CROSS-PLATFORM REMOTE ACCESS TO 3D GRAPHICS APPLICATIONS

(75) Inventor: William Tidd, Alton Bay, NH (US)

(73) Assignee: hopTo Inc., Campbell, CA (US)

( * ) Notice: Subject to any disclaimer, the term of this patent is extended or adjusted under 35 U.S.C. 154(b) by 146 days.

(21) Appl. No.: 13/399,764

(22) Filed: Feb. 17, 2012

Related U.S. Application Data

(63) Continuation-in-part of application No. 13/341,570, filed on Dec. 30, 2011.

(51) Int. Cl.
G06F 15/16 (2006.01)

(52) U.S. Cl.
USPC ............ 709/219; 709/203; 345/419; 345/522

(58) Field of Classification Search
USPC .......... 709/202–203, 217–219; 345/418–419, 345/501–502, 522
See application file for complete search history.

(56) References Cited

U.S. PATENT DOCUMENTS

| | | | |
|---|---|---|---|
| 6,104,392 A | 8/2000 | Shaw et al. | |
| 6,216,151 B1 * | 4/2001 | Antoun | ........................ 709/219 |
| 6,831,635 B2 | 12/2004 | Boyd et al. | |
| 7,432,934 B2 | 10/2008 | Salazar et al. | |
| 8,001,531 B1 | 8/2011 | Rideout et al. | |
| 8,171,154 B2 | 5/2012 | Vonog et al. | |
| 8,253,732 B2 * | 8/2012 | Hamill et al. | ................. 715/740 |
| 8,264,494 B2 | 9/2012 | Kilani et al. | |
| 8,266,232 B2 | 9/2012 | Piper et al. | |
| 2006/0082581 A1 | 4/2006 | Schmieder et al. | |
| 2006/0082582 A1 | 4/2006 | Schmieder et al. | |
| 2006/0082583 A1 | 4/2006 | Leichtling et al. | |
| 2006/0085550 A1 | 4/2006 | Schmieder et al. | |
| 2006/0087512 A1 | 4/2006 | Schmieder et al. | |
| 2006/0176296 A1 | 8/2006 | Hoffman et al. | |
| 2006/0284867 A1 | 12/2006 | Ishikawa et al. | |
| 2007/0171222 A1 | 7/2007 | Kowalski | |
| 2008/0165198 A1 | 7/2008 | Bakalash et al. | |
| 2008/0316218 A1 | 12/2008 | Kilani et al. | |
| 2009/0195537 A1 | 8/2009 | Qiu et al. | |
| 2009/0207167 A1 * | 8/2009 | Pasetto | .......................... 345/419 |
| 2009/0231329 A1 | 9/2009 | Swaminathan et al. | |
| 2010/0131944 A1 | 5/2010 | Iorio et al. | |
| 2010/0220098 A1 | 9/2010 | Holler et al. | |
| 2010/0254603 A1 | 10/2010 | Rivera | |
| 2010/0306783 A1 * | 12/2010 | Dake | ............................. 709/217 |
| 2011/0045891 A1 | 2/2011 | Ansari | |
| 2012/0059881 A1 | 3/2012 | Koster et al. | |
| 2012/0075346 A1 | 3/2012 | Malladi et al. | |
| 2012/0084456 A1 | 4/2012 | Vonog et al. | |

(Continued)

OTHER PUBLICATIONS

Spice for Newbies [online], Red Hat, Inc. 2009 [retrieved on May 13, 2013]. Retrieved from the Internet.

(Continued)

*Primary Examiner* — Bharat N Barot
(74) *Attorney, Agent, or Firm* — Lewis Roca Rothgerber LLP

(57) ABSTRACT

A server computing system in a client-server computing environment includes a virtual display driver that marshals and transmits graphics application programming interface (API) functions to a client via a network. The server may receive capability information from the client, allowing the virtual display driver to resolve differences between the APIs supported on the server and the client.

11 Claims, 4 Drawing Sheets

(56) References Cited

U.S. PATENT DOCUMENTS

| | | |
|---|---|---|
| 2012/0117145 A1 | 5/2012 | Clift et al. |
| 2012/0154389 A1 | 6/2012 | Bohan et al. |
| 2012/0166967 A1 | 6/2012 | Deimbacher et al. |
| 2012/0246227 A1 | 9/2012 | Vonog et al. |
| 2012/0254450 A1* | 10/2012 | Lejeune et al. .............. 709/203 |
| 2012/0329559 A1 | 12/2012 | Mahajan et al. |
| 2013/0047189 A1 | 2/2013 | Raveendran et al. |
| 2013/0307847 A1* | 11/2013 | Dey et al. ..................... 345/419 |

OTHER PUBLICATIONS

U.S. Appl. No. 13/341,570, Office Action dated Jun. 16, 2013.
U.S. Appl. No. 13/399,738, Office Action dated Jun. 25, 2013.
U.S. Appl. No. 13/341,049, Office Action mailed Feb. 20, 2014.
U.S. Appl. No. 13/399,717, Office Action mailed Feb. 14, 2014.
U.S. Appl. No. 13/341,086, Office Action mailed Nov. 7, 2013.
U.S. Appl. No. 13/399,738, Final Office Action dated Dec. 4, 2013.
U.S. Appl. No. 13/341,570, Final Office Action dated Dec. 16, 2013.

* cited by examiner

US 8,769,052 B1

CLOUD-BASED SERVER COMPUTING SYSTEM FOR AND METHOD OF PROVIDING CROSS-PLATFORM REMOTE ACCESS TO 3D GRAPHICS APPLICATIONS

RELATED APPLICATIONS

This application is a continuation-in-part of U.S. patent application Ser. No. 13/341,570, filed Dec. 30, 2011, the entirety of which is incorporated by reference herein.

TECHNICAL FIELD

The present disclosure relates generally to a server computing system in a client-server computing environment, and more particularly to a server computing system for and method of providing cross-platform remote access to 3D graphics applications.

BACKGROUND

In a client-server computing system, a computer application or program that is running on one computer (i.e., the server) may be accessible to another computer (i.e., the client) over a network, such as over the Internet. The user interface running on the server is exposed and visible to the client. In this way, the client has remote access to the server and the user of the client device can interact with the application that is running on the server.

The server application may be, for example, an application that processes two-dimensional (2D) and/or three-dimensional (3D) graphics. In this example, a 2D and/or 3D graphics application may be used to render graphical objects on a computer display. Currently, in a client-server computing system, the high-level graphics representation (e.g., Direct3D, OpenGL) is reduced to an image (e.g., a bitmap image) at the server. The image is then transmitted from the server to the client over the network. Once received at the client, the image is rendered on the client display. Creating, compressing, and transmitting these image files may result in high CPU utilization (i.e., computing load) at the server, especially when the application displays objects in motion and when there are a large number of remote users sharing the server. Further, images are often large and, therefore, transmitting images to a large number of remote users consumes a large amount of network bandwidth.

BRIEF DESCRIPTION OF THE DRAWINGS

Various inventive embodiments disclosed herein, both as to its organization and manner of operation, together with further objectives and advantages, may be best understood by reference to the following description, taken in connection with the accompanying drawings as set forth below.

DETAILED DESCRIPTION

The disclosure provides a server computing system in a client-server computing environment that provides cross-platform remote access to 3D graphics applications and methods of efficiently providing graphic commands to a computer (client) located remotely from the server. The server computing system of the disclosure exhibits numerous advantages over existing systems. In various embodiments, the server provides 3D graphics application capabilities to a large number of clients while avoiding excessive computing load. Further, the server computing system of the disclosure may provide such 3D graphics application capabilities at lower network bandwidth requirements. Further still, the server computing system of the disclosure may be configured to service clients operating on different platforms.

Figure 1:
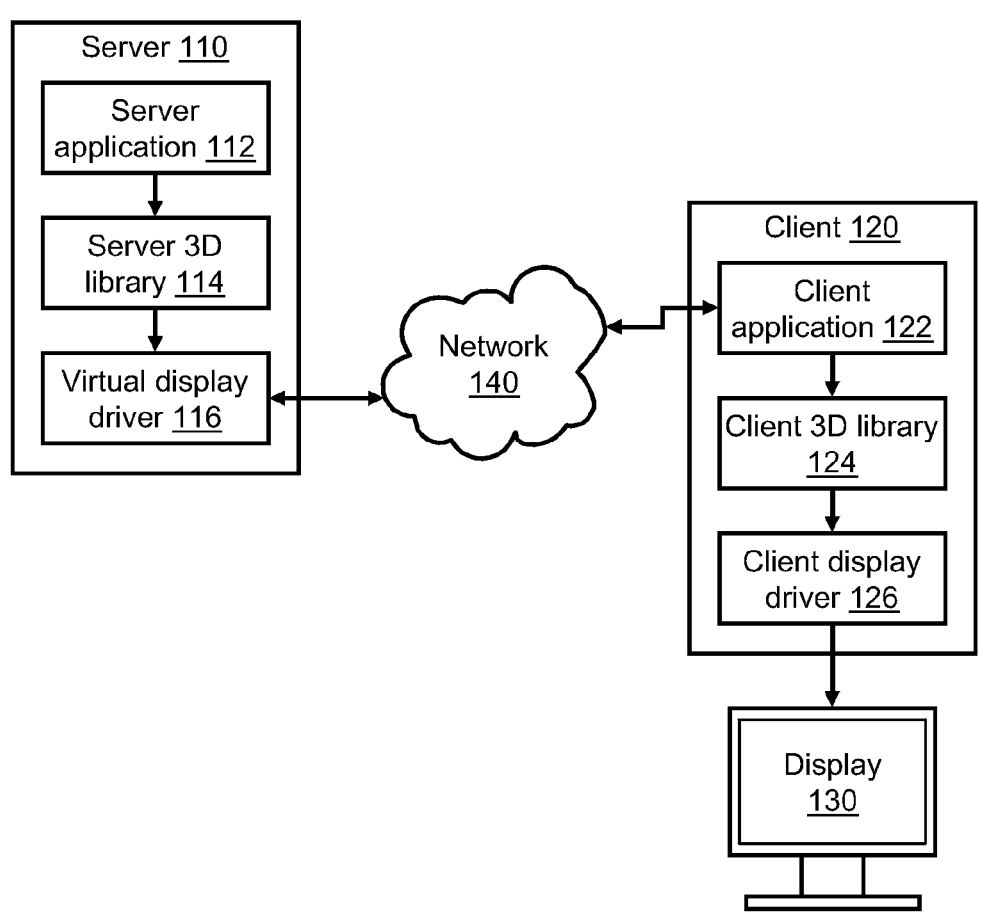
FIG. 1 illustrates a block diagram of a client-server computing system for providing cross-platform remote access to 3D graphics applications, according to the present disclosure.

FIG. 1 illustrates a block diagram of a client-server computing system 100 for providing cross-platform remote access to 3D graphics applications. Client-server computing system 100 includes a server 110 that is operatively connected to a client 120 and a display 130 via a network 140. Network 140 may be, for example, a local area network (LAN) and/or a wide area network (WAN) for connecting to the Internet. Entities of client-server computing system 100 may connect to network 140 by any wired and/or wireless means.

While client 120 and display 130 are illustrated as separate physical components (e.g., illustrative of a common implementation of a desktop or a workstation computing system, such as clients running natively on Windows, Linux, UNIX, and Mac OS X operating system), the capabilities of such separate components can also be integrated in a single device (e.g., a mobile device or a tablet computer). For example, the mobile device can be an iPad tablet computer on the iOS operating system (Apple Inc., Cupertino, Calif.), or other mobile client on either the Android operating system (Google Inc., Mountain View, Calif.) or the Windows CE operating system (Microsoft Corp., Redmond, Wash.). Thus, as used herein, the terms "client" or "client computer" should be understood to include any such implementations.

Server 110 is a server computing system that includes a server application 112, a server 3D library 114, and a virtual display driver 116 that, in accordance with the client-server model of computing, collectively function to enable server 110 to provide various resources or services to client 120, which may be located remotely from the server. In accordance with the present disclosure, these resources or services pertain to computer graphics.

Client 120 includes a client application 122, a client 3D library 124, and a client display driver 126. Collectively, these elements function to enable the client and the client user to consume computer graphics resources or services provided by server 110.

Server application 112 represents an application executing (i.e., "running") on server 110. The functionality of server application 112 shall be visible to and accessible by client 120 via network 140. For example, server application 112 may be a computer-aided design (CAD) application, such as AutoCAD (Autodesk, Inc., San Rafael, Calif., USA) or Cadence Virtuoso (Cadence Design Systems, San Jose, Calif.); a medical clinical workflow application, such as Symbia.net (Siemens AG, Munich, Germany); an interactive mapping application, such as Google Earth (Google, Inc.); or a 3D game. The functionality of server application 112 shall be visible to and accessible by client 120 via network 140. For example, the functionality of server application 112 may be accessed from client 120 using a process herein known as application publishing, which is currently supported by products such as GraphOn GO-Global, Microsoft Remote Desktop Services, and Citrix XenApp. Such application publishing may be performed in accordance with teachings of commonly-owned U.S. Pat. No. 5,831,609, filed Jun. 6, 1995, entitled "Method and system for dynamic translation between different graphical user interface systems," which is incorporated by reference as though fully set forth herein.

Client application 122 represents an application installed on and executing on client 120 that emulates a user interface of server application 112. For example, the client application may run in a browser and be implemented in a scripting language, such as JavaScript, a multimedia platform, such as Adobe Flash, or as a browser add-on (e.g., ActiveX control for Internet Explorer). Additionally, client application 122 may run as a standalone application. Client application 122 may receive various input commands from the user via an input device (not shown in FIG. 1), then transmit these commands to server 110, and update the user interface of client application 122 in response to computer graphics commands transmitted from server 110 back to client 120 over network 140.

Server 3D library 114 and client 3D library 124 provide a set of common interfaces or graphics functions to server 110 and client 120, respectively. These components are also referred to herein as a high-level graphics language or a graphics application programming interface (API). In one embodiment of the disclosure, both server 110 and client 120 utilize a library, such as OpenGL (Khronos Group, Beaverton, Oreg.). This enables server 110 and client 120 to communicate at an interface or a graphics functions level, even if server 110 operates on a different computing platform from client 120. This is in contrast to conventional client-server computing systems that have utilized operating system-specific APIs to accomplish computer graphics rendering, which should not be considered cross-platform.

Virtual display driver 116 is a software code module that enables commands or functions that are called in server 3D library 114 to be marshaled (i.e., encoded) and transmitted to client 120 over network 140. Marshaling (or marshalling) is the process of transforming the memory representation of such commands to a data format suitable for transmission via network 140. For example, virtual display driver 116 assigns an ID to each graphics function and converts function arguments from a platform-specific byte order into a common byte order that all clients can read, regardless of the native byte order of the client device. This encoding allows graphic objects and their motions to be represented much more efficiently than the conventional method of generating an image for each arrangement or view of the objects. Significantly less data must be compressed and transmitted by the server, greatly reducing CPU usage on the server and network bandwidth usage.

Client display driver 126 includes a software code module that receives marshaled data from server 110 via client application 122 and executes the 3D library functions using client 3D library 124. This enables client 120 to handle intensive graphics rendering operations, such as blending or shading, while enabling server 110 to share server application 112 with a large pool of clients. This also reduces the bandwidth requirements of network 140 as pixel array image data (e.g., in the form of Bitmap image files) no longer needs to be transmitted from server 110 to individual clients, such as client 120, as was the case in conventional client-server computing systems.

Figure 2:
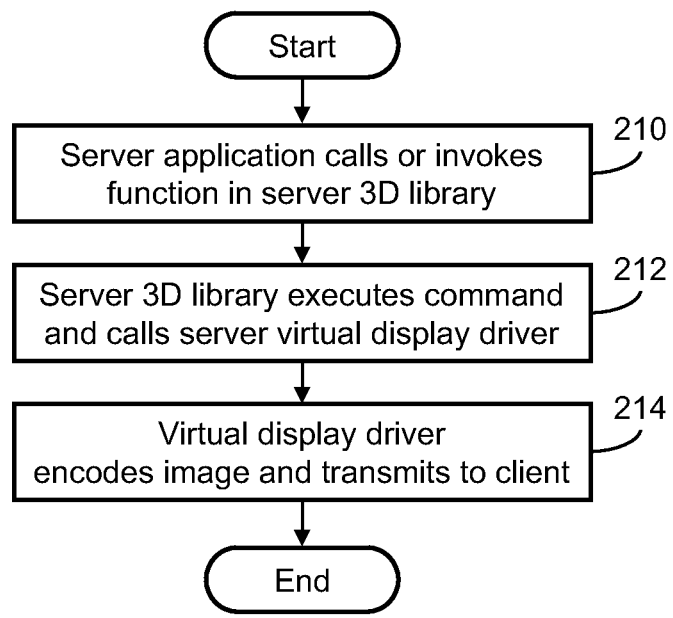
FIG. 2 illustrates a flow diagram of a conventional method of providing cross-platform remote access to 3D graphics applications in a client-server computing system.

By way of useful background, FIG. 2 illustrates a flow diagram of a conventional method 200 of providing cross-platform remote access to 3D graphics applications in a client-server computing system. Prior to invocation of the conventional method 200, a server has accepted a connection from a client and a request to a client application on the server. The conventional method 200 may include the following steps.

At a step 210, the server application calls or invokes the appropriate function or functions (i.e., "graphics commands") in the server 3D library that will satisfy the client request. For example, the graphics commands may include blending or shading.

At a step 212, the server 3D library executes each of the graphics commands and calls a virtual display driver on the server with the resulting pixel image array data (e.g., bitmap image data). As previously described herein, this conventional implementation burdens the server with both intensive graphics rendering operations and with servicing clients, which may be undesirable in architectures where it is desirable that the server support a number of remote users simultaneously.

At a step 214, the virtual display driver on the server encodes the pixel image array data and transmits the information to the client via the network. This step may include conventional data compression techniques, such as zlib encoding.

Figure 3:
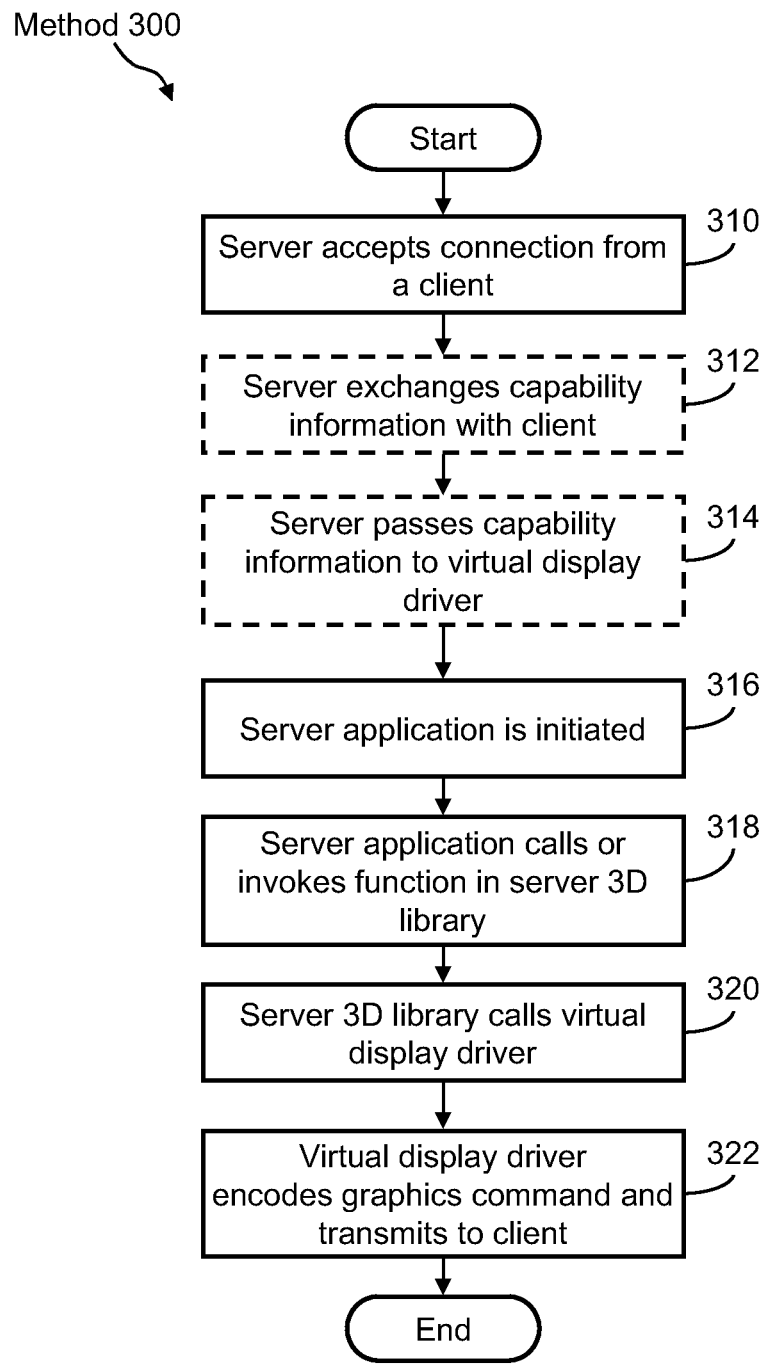
FIG. 3 illustrates a flow diagram of a method of providing cross-platform remote access to 3D graphics applications in a client-server computing system, according to the present disclosure.

FIG. 3 illustrates a flow diagram of a method 300 of providing cross-platform remote access to 3D graphics applications using client-server computing system 100 of the disclosure. Method 300 may include, but is not limited to, the following steps.

At a step 310, a server component accepts a connection from client 120. For example, the connection may be established in accordance with a Transmission Control Protocol/Internet Protocol (TCP/IP) model as is known to one of skill.

At an optional step 312, server 110 exchanges capability information (i.e., negotiate protocols) with client 120, which may be of use in later steps of method 300 in which virtual display driver 116 encodes commands from server 3D library 114. For example, the capability information received by server 110 may include information about the particular APIs (e.g., OpenGL windowing APIs) supported by components of client 120, such as client display driver 126. The capability information may include the version or versions of client 3D library 124 (e.g., OpenGL 3.2) that are available on client 120. The capability information may also include any extensions available on client 120 that can act as an adapter between the functionality of different versions of server 3D library 114 and client 3D library 124.

At an optional step 314, server 110 may forward the capability information from the server component that is in direct network communication with client 120 to virtual display driver 116. Virtual display driver 116 then stores the information in a memory so that the information can be quickly accessed. This enables virtual display driver 116 to maintain (e.g., expand, update) a central repository of capability information of all client devices. It also enables virtual display driver 116 to quickly lookup the capability of a particular client 120 at resource or service request time.

At a step 316, server application 112 on server 110 is initialized. In the example of server application 112 being an AutoCAD application, this step may include, for example, server 110 carrying out various startup instructions of the AutoCAD application. Generally, server application 112 loads and initializes server 3D library 114. Then, (or at an earlier or later time) server 3D library 114 queries virtual display driver 116 to determine its capabilities. Virtual display driver 116 generally returns the capabilities of client 120, but may also return capabilities that are not supported by client 120 if virtual display driver 116 or other software on server 110 can convert a command that client 120 does not support into one or more commands that client 120 does support.

At a step 318, server application 112 calls or invokes the appropriate function or functions (i.e., "graphics commands") in server 3D library 114 in response to a request of client 120. For example, if client 120 issues a request to draw a 3D cube, a call is made to server 3D library 114 to satisfy the "draw 3D cube" request.

At a step 320, server 3D library 114 receives the call made by server application 112 at step 318. Server 3D library 114 then executes the function by making one or more calls to the virtual display driver 116, taking into consideration the version-specific capabilities that were received and stored at step 312. Unlike conventional client-server computing systems, server 3D library 114 does not generally execute the graphics commands and produce a bitmap image.

At a step 322, virtual display driver 116 encodes each of the received graphics calls and transmits the information to client 120 via network 140. According to one aspect of the disclosure, virtual display driver 116 may distinguish between platform-specific graphics calls (i.e., the call is specific to the platform of server 110, e.g., windowing functions) and cross-platform graphics calls. If a platform-specific call is intercepted, virtual display driver 116 can either translate the call to a cross-platform supported interface or to a different, platform-specific call that is supported by client 120. By way of one example, translation may include converting a Microsoft Windows operating system implementation of the OpenGL specification (e.g., a WGL function) to an X11 operating system implementation equivalent (e.g., a GLX function). The capability information of optional steps 312 and 314 may be used to determine the specific translation required for server and client. If a cross-platform graphic call is intercepted, virtual display driver 116 may transmit the call as-is. Alternatively, if the 3D command makes use of only two dimensions and can be transmitted more efficiently via an equivalent 2D command, the 3D command may be converted to the 2D alternative. In all of these cases, the transmitted information is a representation of a graphics command that each client 120 supports.

Figure 4:
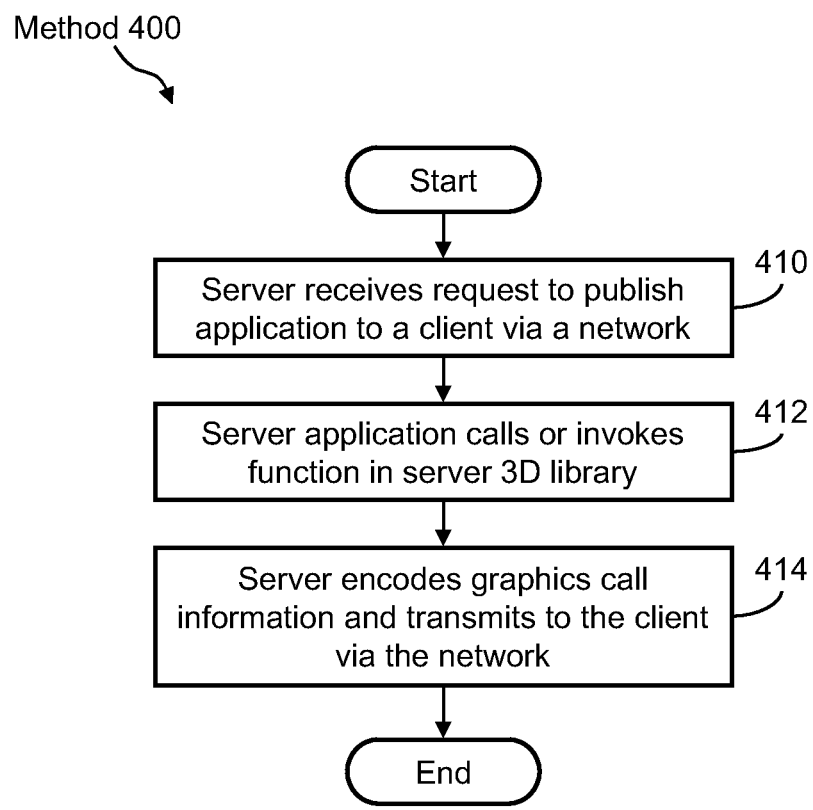
FIG. 4 illustrates a flow diagram of a method of providing cross-platform remote access to 3D graphics applications in a client-server computing system, according to a minimum configuration of the present disclosure.

FIG. 4 illustrates a flow diagram of a method 400 of providing cross-platform remote access to 3D graphics applications in a client-server computing system, according to a minimum configuration of the present disclosure. Method 400 may include, but is not limited to, the following steps.

At a step 410, server 110 receives a request to publish a server application 112 to client 120 via network 140. For example, a request to draw a 3D cube can be received by server 110. Optionally, the request can include information about relevant capabilities of client 120, such as the version or versions of client 3D library 124 supported on client 120.

At a step 412, server application 112 calls or invokes the appropriate function or functions (i.e., "graphics commands") in server 3D library 114 in response to the request received by server 110. For example, if the request is to draw a 3D cube, the graphics commands may relate to geometric operations and/or rendering options, such as blending or shading.

At a step 414, server 3D library 114 receives the call made by server application 112 and executes the function by making one or more calls to virtual display driver 116. In one embodiment of the disclosure, the calls made to virtual display driver 116 take into consideration the capabilities of client 120 received at step 410. Virtual display driver 116 encodes each of the graphics calls and provides a transmission including the one or more graphics calls to client 120 via network 140.

Various embodiments of the present disclosure allow for the functionality of this disclosure to be performed by an intermediary device, such as a cloud server (not shown), which may be associated with the server 110 and client 120, or reside elsewhere in the network (e.g., in the cloud). For example, while client 120 is interacting with server 110, some of the methods described herein may be offloaded to the cloud server to be performed. Additionally, the cloud server may be used to facilitate interaction between individual or multiple clients and server 110 by performing protocol and/or graphics conversions as described herein.

I claim:

1. A cloud-based server computing system for providing cross-platform remote access to 3D graphics applications, the server computing system comprising:
   a client device having a client library and a server having a server library operatively connected through a network, wherein the server library is different from the client library;
   a cloud server operatively coupled to the client device and the server through a network;
   the server comprising a server application, and functionality for making the server application visible to and accessible by the client device;
   the server configured to:
      receive a request from the client to publish the server application;
      receive, from the cloud server, compatibility information regarding the graphics capability of the client device, the graphics capability comprising information regarding the client library;
      initiate the server application, wherein the server application makes a graphics call to the server library;
      encode the graphics calls associated with the initiated server application in accordance with the graphics capability comprised of information regarding the client library; and
      transmit the encoded graphics calls to the client device for execution using graphics capabilities comprised of the client library.

2. The cloud-based system of claim 1, where the server and the client device operate on different computing platforms.

3. The cloud-based system of claim 1, wherein the client device and server exchange capability information.

4. The cloud-based system of claim 3, wherein the capability information further includes API's supported by the client device.

5. The cloud-based system of claim 4, wherein the capability information is stored on the server for later retrieval.

6. A method for providing cloud-based cross-platform remote access to 3D graphics applications, the method comprising:
   receiving a request over a communication network from a client device having a client library to access a server application at a server having a server library, wherein the server library is different from the client library;
   receiving compatibility information over the communication network regarding the graphics capability of the client device from a cloud server, the graphics capability comprising information regarding the client library;
   executing instructions stored in memory, wherein execution of the instructions by a processor:

initiates the server application, wherein the server application makes a graphics call to the server library; and encodes the graphics calls associated with the initiated server application in accordance with the graphics capability comprised of information regarding the client library; and transmitting the encoded graphics calls to the client device for execution using graphics capabilities comprised of the client library.

7. The method of claim 6, where the server and the client device operate on different computing platforms.

8. The method of claim 6, wherein the client device and server exchange capability information.

9. The method of claim 8, wherein the capability information includes API's supported by the client device.

10. The method of claim 9, further comprising storing the capability information the server for later retrieval.

11. A non-transitory computer-readable storage medium, having embodied thereon a program executable by a processor to perform a method for providing cross-platform remote access to 3D graphics applications, the method comprising:

receiving a request from a client device having a client library to access said server application on a server having a server library, wherein the server library is different from the client library;

receiving compatibility information regarding the graphics capability of the remote client from a cloud server, the graphics capability comprising information regarding the client library;

initiating the server application, wherein the server application makes a graphics call to the server library;

encoding the graphics calls associated with the initiated server application in accordance with the graphics capability comprised of information regarding the client library; and transmitting the encoded graphics calls to the client device for execution using graphics capabilities comprised of the client library.

\* \* \* \* \*